Nov. 29, 1927.

J. FÉNELON 1,651,262

THERMOSTAT

Filed Jan. 2, 1926

WITNESSES

INVENTOR,
Juan Fenelon.
BY
ATTORNEYS.

Nov. 29, 1927.
J. FÉNELON
THERMOSTAT
Filed Jan. 2, 1926
1,651,262
2 Sheets-Sheet 2
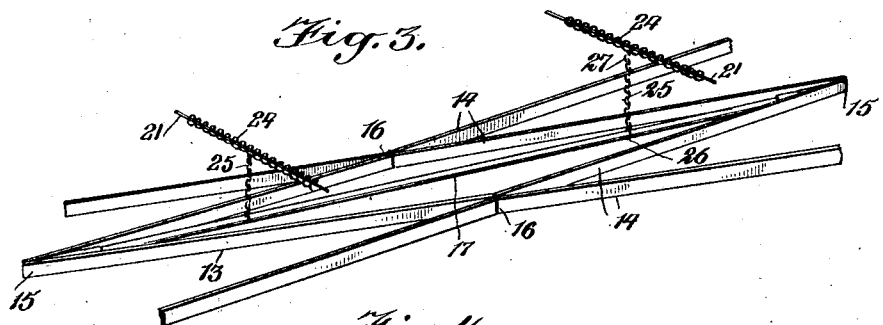
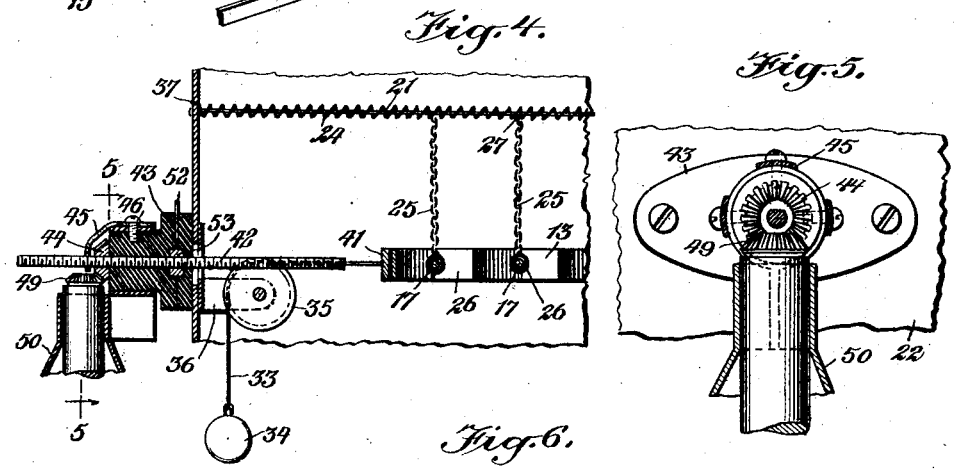
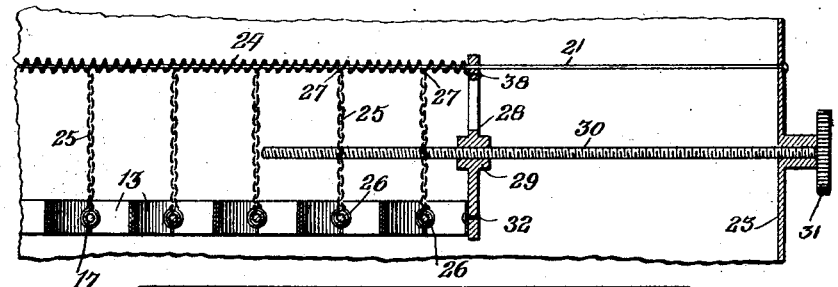
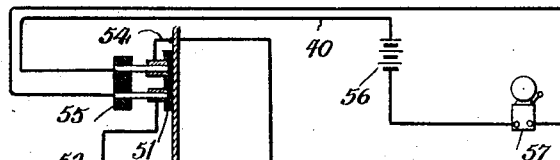
INVENTOR,
Juan Fenelon
BY
ATTORNEYS.

Patented Nov. 29, 1927.

1,651,262

UNITED STATES PATENT OFFICE.

JUAN FÉNELON, OF OAXACA, MEXICO, ASSIGNOR OF TWENTY-FIVE ONE-HUNDREDTHS TO ROBERT WILSON, TEN ONE-HUNDREDTHS TO GEORGE S. CLARK, AND TEN ONE-HUNDREDTHS TO DAVID C. BRANDON, ALL OF OAXACA, MEXICO.

THERMOSTAT.

Application filed January 2, 1926. Serial No. 79,007.

This invention relates to thermostats, and has especial reference to the class of devices used for regulating temperature and for controlling signaling mechanisms.

The principal object of the present invention is to provide an improved device of the indicated character which will be more thoroughly efficient and effectual for nearly all purposes for which thermostats are used.

Another object of the invention is to provide a thermostat characterized by adjustibility for rendering the thermostat susceptible and operative to various degrees of heat.

Another object of the present invention is to provide a thermostat which is especially adapted to be used in conjunction with a signaling mechanism which will be actuated by the thermostat, and which signaling mechanism will be characterized by adjustibility to render the signaling mechanism operative and responsive to the thermostat under its various conditions of adjustment.

The nature of the invention and its distinguishing features and advantages will appear when the following specification is read in conjunction with the accompanying drawings, in which:

Fig. 3 is a fragmentary perspective view of the thermostatic means and showing the manner in which it is suspended.

Fig. 4 is an enlarged sectional view showing more clearly certain details of the present invention.

Fig. 5 is a detail view taken substantially on the line 5—5 of Fig. 4.

Fig. 6 is an enlarged fragmentary sectional view illustrating more clearly certain details of the present invention.

Fig. 8 is a diagrammatic view illustrating the circuit closing means.

Figure 1:
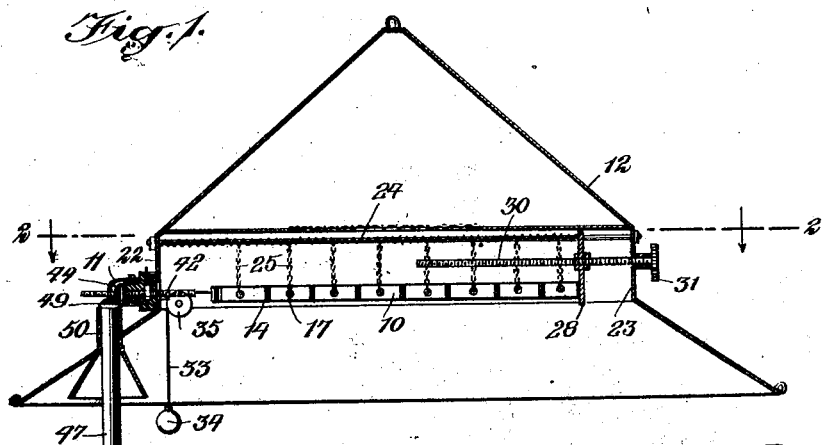
Figure 1 is a sectional elevation illustrating one application of the present invention.
Figure 2:
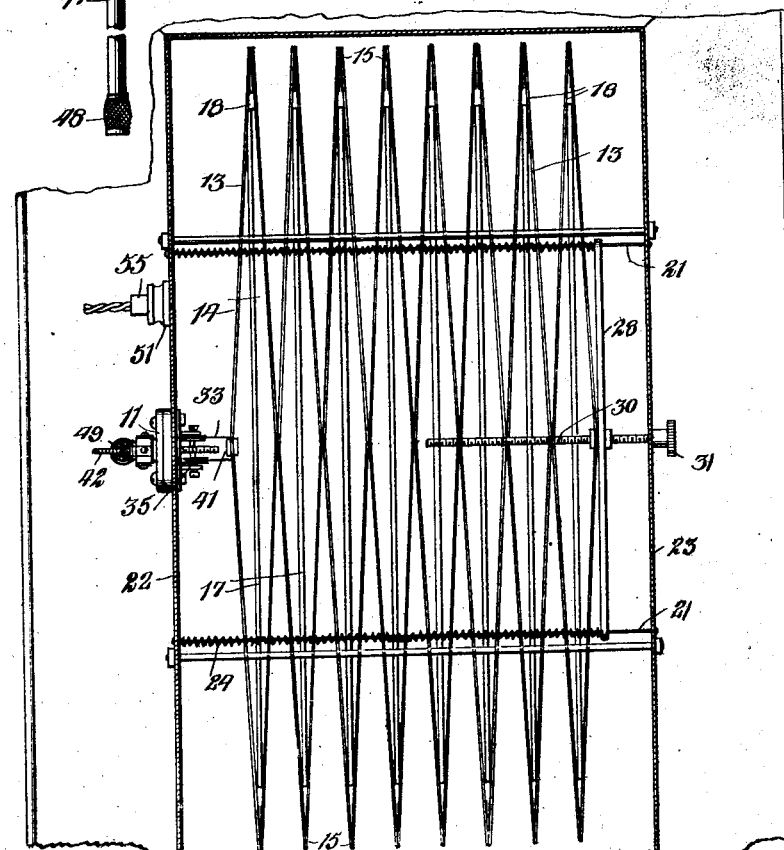
Fig. 2 is a sectional view taken on the line 2—2 of Fig. 1 and looking in the direction indicated by the arrows.

The present embodiment of the invention as hereinafter described and as illustrated in the drawings is by way of example only. In the present instance, and in accordance with the present invention, the thermostatic means 10 is employed in conjunction with a circuit closing means 11 which may form a part of a signaling or alarm mechanism. The thermostatic means 10 will be arranged in some suitable location so as to be susceptible to mounting heat and, as shown in Fig. 1 of the drawings, is arranged within a canopy or cupola 12 which may form a part of a structure of a dwelling or shop where certain activities are being carried out and wherein the condition of temperature has to be known and controlled. The thermostatic means 10 is suspended from portions of the canopy or cupola 12 which will constitute a supporting structure. The thermostatic means comprises a plurality of heat responsive elements 13. Each of the elements 13 consists of members or strips of zinc 14 which are connected together, as at 15, at their opposite ends in pairs and which are further connected together, as at 16, substantially centrally, or at a point midway of their ends; one pair of strips being connected to another so as to produce interconnected elements. Each of the elements 13 also includes members or tubes 17 of steel or glass, preferably the latter, which are held in place by members 18. The tube 17 of each element 13 is arranged between the strips 14 by virtue of the opposite ends of the tube being held respectively in tubular portions 19 of the pair of members 18 employed with portions 20 respectively of the members 18 being fastened in any suitable manner, such as by soldering, between the related ends of the strips 14.

In order to suspend the means 10 and to permit the same to respond properly to the action of heat there are provided wires 21 which are spaced and are supported by the walls 22 and 23 of the cupola 12. Surrounding each of the wires 21 is a coil spring 24. A pair of flexible elements, such as the chains 25, is employed in conjunction with each of the tubes 17, and each of the chains 25 has one end thereof connected, as at 26, to the tube 17 and its opposite end is connected, as at 27, to a coil of the related spring 24.

In order to make the thermostatic means 10 adjustable to be responsive to the various degrees of heat there is provided a means presently to be described which will place the said means 10 under varying degrees of tension. The said tensioning means includes a member 28 which is slidable on the wires 21. The said member 28 has a screw-threaded bore 29 therein located centrally thereof which receives for threading action a screw 30 which is also screw-threaded in a bore formed in a portion of the wall 23. The screw 30 is manipulated by a knurled head 31 which is arranged outside of the wall 23. It is to be noted that one strip 14 of the element 13 adjacent the member 28 is attached thereto, as at 32. Connected to a strip 14 of the element 13 adjacent the wall 22 are flexible elements 33 each of which has one end thereof attached to the said strip and its opposite end is connected to a weight 34, and each of the elements 33 passes over a sheave 35. The sheaves 35 are rotatably supported between spaced lugs of a bracket 36 attached to the wall 22. It should be understood that the zinc strips 14 and glass tubes 17 are of different coefficients of expansion. It should now be apparent that the thermostatic means described is one which is very sensitive and responsive to heat and that expansion in the means 10 results from the individual expansion of each of the elements 13 which is the vital reason why the means 10 is very sensitive and responsive to heat. By virtue of the tension means employed it is possible to adjust the means 10 to be sensitive and responsive to various degrees of temperature and may be made adjustable to meet all conditions under which it will operate. Each of the springs 24 has one end thereof attached to the wall 22, as at 37, and its opposite end is attached to the member 28, as at 38. The springs are in the nature of pull springs and, due to the fact that they are attached to the wall 22 and member 28, will cause the proper distribution of the elements 13 when the member 28 is moved in the adjustment of the thermostatic means 10.

Figure 7:
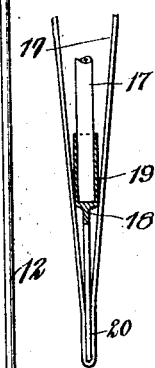
Fig. 7 is a structural detail view of one of the heat responsive elements.

In the present embodiment of the invention the thermostatic means 10 is shown in conjunction with a circuit closing means 40 which may form a part of an alarm mechanism, but obviously the means 10 may be used in conjunction with any other mechanism with which it will be useful. The means 40 includes a contact 41 carried by a strip of one of the elements 13 which will move in contact with the end of a screw 42 under the expansion of the means 10. The screw 42 coacts with the threads of a bore in a fixture 43 of insulating material which is attached to the wall 22. A beveled pinion 44 is held against longitudinal movement with respect to the screw 42 by virtue of a portion of the fixture 43 and a retaining member 45 attached, as at 46, to the fixture 43. In order to effect the rotation of the pinion 44 and, therefore, the longitudinal movement of the screw 42 there is provided a device 47 which has a handle 48 at one end and a beveled pinion 49 at its opposite end. A guide 50 is attached to a portion of the cupola 12. One end of the device 47, the end having the pinion 49 thereon, is inserted in the guide 50 so as to bring the pinion 49 in meshing relationship with the pinion 44. By manipulating the handle 48 motion will be transmitted to the screw 42 to move the same to the desired adjusted position. In this way the distance between the end of the screw 42 and the contact 41 may be varied and thus contact between these parts will occur under various conditions of expansion of the means 10 to close a circuit. The circuit is completed, as shown in Fig. 7 of the drawings. The circuit includes a socket 51, one terminal of which is connected by a wire 52 to the screw 42, as at 53, and the other terminal of the socket 51 is connected, as at 54, to the wall 22 which has electrical connection to the means 10 through and by virtue of the other walls of the cupola 12 and the connection 32. A two-terminal plug 55 is employed which is electrically connected to a source of electrical energy 56 and a signal device 57 in the form of a bell. By bringing the terminals of the plug 55 in contact with the terminals of the socket 51 the circuit will be closed through the signal 57 and if the means 10 has been expanded a predetermined degree in which the contact 41 will be in engagement with the screw 42 the signal 57 will be rendered active and thus it will be known that there obtains a certain temperature which may be a dangerous temperature necessitating the control of the source from which the heat issues.

From the foregoing it will be apparent that there has been described a thermostat which may be adjusted to be operative under various degrees of heat and which will, therefore, be useful to actuate a signaling mechanism at almost any desired temperature; and that the signaling mechanism employed is also adjustable to compensate for the adjustment made in the thermostat so that the signaling mechanism will be responsive under all conditions of the thermostat.

It is to be understood that the invention is not restricted to the precise arrangement of parts shown and described, as details of construction may be modified and parts may be rearranged without departing from the spirit of the invention, the scope of which is limited only by the terms of the appended claims.

What I claim is:

1. The combination of a cupola, thermostatic means comprising a plurality of heat responsive elements connected together; and non-rigid means for expansibly suspending said heat responsive elements from said cupola.

2. The combination of a cupola, thermostatic means comprising a plurality of heat responsive elements connected together;

means for expansibly suspending said heat responsive elements from said cupola, and tensioning means for varying the total degree of lateral motion of said thermostatic means.

3. In a thermostat, thermostatic means comprising a plurality of heat responsive elements, means for varying the degree of lateral motion of each of said elements to vary the total degree of lateral motion of said thermostatic means, and non-rigid supporting means for expansibly suspending the thermostatic means.

4. In a thermostat, thermostatic means comprising a plurality of heat responsive elements, means for varying the degree of lateral motion of each of said elements to vary the total degree of lateral motion of said thermostatic means, and supporting means for expansibly suspending the thermostatic means, said supporting means including extensible elements, and flexible members, the flexible members being connected respectively between portions of the extensible elements and the heat responsive elements.

5. In a thermostat, thermostatic means comprising a plurality of heat responsive elements, means for varying the degree of lateral motion of each of said elements to vary the total degree of lateral motion of said thermostatic means, and supporting means for expansibly suspending the thermostatic means, said supporting means including extensible elements, and flexible members, the flexible members being connected respectively between portions of the extensible elements and the heat responsive elements.

6. In a thermostat, thermostatic means comprising a plurality of heat responsive elements, tensioning means for varying the degree of lateral motion of each of said elements to vary the total degree of lateral motion of said thermostatic means, and supporting means for expansibly suspending the thermostatic means, said supporting means including extensible elements, and flexible members, the flexible members being connected respectively between portions of the extensible elements and the heat responsive elements, and said tensioning means including pull weights at one side of the thermostatic means, and an adjusting device operatively connected to the opposite side of said thermostatic means.

7. In a thermostat, a plurality of heat responsive elements expansibly connected together, each of said elements comprising a pair of zinc strips connected together at their opposite ends, and a glass member connected to and supported between said zinc strips; and supporting means connected to said glass members, said supporting means serving for expansibly suspending the said elements.

8. In a thermostat, thermostatic means, tensioning means acting on the thermostatic means for varying the degree of lateral motion of the thermostatic means, said tensioning means including pull weights acting on one side of the thermostatic means, and an adjusting device operatively connected to the opposite side of said thermostatic means.

9. In a thermostat, thermostatic means, tensioning means acting on the thermostatic means for varying the degree of lateral motion of the thermostatic means, said tensioning means including pull weights acting on one side of the thermostatic means, an adjusting device operatively connected to the opposite side of said thermostatic means, said adjusting device comprising supporting wires, a member arranged for sliding movement on said wires, said thermostatic means connected at one side to said member, a spring exerting a pull on said member in one direction, and an adjusting element connected to said member for maintaining said member in different adjusted positions.

10. A thermostat comprising a support, thermostatic means, flexible means suspending the thermostatic means from said support, pulleys on said support, a flexible connection passed over each pulley and connected at one end to the thermostatic means and its other end having a weight for exerting a pull on the thermostatic means in one direction, wires carried by the support, a member arranged on said wires for sliding movement, said thermostatic means connected to said member at a point on said thermostatic means opposite to that at which the aforesaid flexible connections are connected thereto, means constantly exerting a pull on said member in one direction, and an element adjustably carried by said support and connected to said member for adjustably maintaining said member in different adjusted positions to thereby combine with the connected weights to vary the degree of lateral motion of said thermostatic means.

JUAN FÉNELON.